Patented Mar. 15, 1927. 1,621,118

UNITED STATES PATENT OFFICE.

WINFORD P. LARSON, OF MINNEAPOLIS, MINNESOTA.

MODIFIED BACTERIA AND TOXINS, IMMUNIZING SERUMS AND METHOD OF PRODUCING THEM.

No Drawing. Application filed November 4, 1925, Serial No. 66,864. Renewed July 30, 1926.

It is the object of my invention to modify bacteria and their products and toxins so that they can be used as antigens more efficaciously; and to produce immunizing serums by the use of such modified antigens.

The present application is in part a continuation of my prior application Serial No. 758,955, filed December 30, 1924, and of my prior application Serial No. 52,963, filed August 27, 1925.

If bacteria or bacterial products and toxins, without being modified or detoxified by some method, are used as antigens by being injected into the system of a human being or other animal, they will ordinarily produce either disease or death unless injected in such small doses that the production of immunity either requires a long series of doses or does not occur at all; while if they are treated and modified by methods previously known and practiced to render them non-poisonous or non-disease-producing, their power to immunize is either seriously interfered with or destroyed or they produce undesirable sensitization effects. This has constituted one of the principal difficulties in producing immunity against the diseases caused by such bacteria and their products or toxins.

In studying this problem, I have discovered how bacteria, as well as their poisonous products, usually spoken of as toxins, may be detoxified without materially lessening their antigenic properties and their power to produce immunity; and, indeed, how their available antigenic properties may in effect be increased, by making it possible to use safely and efficaciously larger amounts of the antigen. In doing this, I attenuate or detoxify such bacteria or toxins, or both, by treating them with a soluble salt of one of the higher fatty acids, which salts are commonly designated as soaps and are all surface-tension depressants, (or capilliary active substances, the two terms being synonomous,) or with a soluble salt of some other organic acid which is surface-tension depressant. The salts I prefer to employ are derived from fatty acids having melting points below 44° C. and are soluble in water at that or a lower temperature. Of these, I prefer the salts derived from unsaturated fatty acids, particularly those having one or more hydroxyl groups, such as a soluble salt of ricinoleic acid, and especially purified castor oil soap. I prefer to work with the castor oil soap solution at a pH of 7.4 to 8.0, within which pH range the desired attenuating effect is at a maximum.

Thus, for example, I may attenuate or modify the pathogenicity of such organisms as streptococci, pneumococci or the ultra microscopic bacteria sometimes spoken of as "filterable viruses" or of such toxins as the diphtheria, tetanus, or scarlet-fever toxins, by treating them in this manner.

The concentration of the castor-oil soap solution after mixture therewith of the bacterial organisms or of the toxin may vary considerably. My experience shows that it should be between 0.1% and 20.0%, and is desirably about 1.0% to 3.0%. The surface-tension depressant renders the organisms or the toxin sufficiently non-poisonous so that many times the normal lethal dose thereof may be injected without producing death, and even without producing material discomfort. Indeed, such a large dose of my modified toxin may be injected without greater ill effects than is ordinarily produced by the small initial dose of the series of doses required to produce immunity in the use of an unmodified toxin. Yet the treated organisms or toxin retain sufficient stimulating power to serve as antigens, so that they incite in the inoculated animal a production of anti-bodies; which give the animal immunity against the corresponding disease.

The organisms or toxins treated in accordance with my invention may be used to inoculate human beings or animals to produce active immunity, against the corresponding disease. This may be done with a very few injections, and ordinarily with a single injection; and may be done without danger of producing anaphylaxis or protein sensitization, such as is caused when a toxin is modified by some animal serum, as in a toxin-antitoxin. I have thus produced active immunity against scarlet fever, diphtheria, and tetanus by the use of modified toxins, and against pneumococcic and streptococcic infections by the use of modified bacterial organisms.

An animal thus actively immunized may be used as a source of anti-body serum, for the treatment of the corresponding disease in other animals or in human beings. The serum is obtained from the inoculated animal, in the usual manner of obtaining serum, by bleeding the animal one or more times. The serum (by which term I include injectable material even though the first fractionation of the blood was to produce plasma) obtained from the blood thus drawn may be used either therapeutically or prophylactically; and is administered by suitable injection, thus giving passive immunity to the patient. I have thus obtained effective anti-body serums against scarlet-fever, diphtheria, and tetanus, and against streptococcic and pneumococcic infections.

The action of the modified or attenuated or detoxified bacterial organisms or toxin in the animal body is due to an adsorption of the fatty-acid salts on the bacterial organisms or on the toxin molecules, or on both, so that upon injection the antigen is at first partially or entirely restrained from exerting its poisonous action, which would otherwise cause a serious reaction, or even death if the dose were of sufficient size. My experience indicates that following the injection the antigen is slowly released from this adsorbed fatty-acid salt, so that the antigen has its effect spread out over a relatively longer period of time instead of being suddenly effective, and the resultant longer-continued stimulation of the body of the inoculated animal or human being causes such body to build up resistance by rapidly and continuously creating the corresponding anti-bodies throughout such longer-continued period of stimulation following the injection of the modified bacterial organisms or modified toxin.

My experience also furnishes evidence that the fatty-acid salt, perhaps by its capacity to dialyze, promotes penetration of the antigen (toxin or bacterial organisms or both) mixed with it into the body tissues, so that such antigen is more widely distributed through the body and thus exerts its antigenic or stimulatory action over a wider area; with a maintenance of the stimulating effect per unit of area below a critical maximum beyond which ill effects and a less proportionate production of anti-bodies occur, and with a greater and more rapid total production of anti-bodies because of the increase in area of the stimulation.

I have found rabbits convenient animals to use for producing the anti-bodies. However, larger animals, such as sheep or horses, are also used with success, especially in large-scale production. The attenuated or detoxified bacterial organisms or the modified toxin, after being treated as above described, are suitably injected into the animal, as by subcutaneous, intraperitoneal, or intravenous injection. There may be several injections at intervals if desired, with gradually increasing doses; and I have found that for the commercial production of anti-body serum, five injections at intervals of about twenty-four hours, with the doses ranging from ten to one thousand times the normal lethal dose of unmodified bacterial organisms or toxin, produce good results. A sufficient time is allowed for the injected organisms or toxin to incite a production of anti-bodies in the body of the inoculated animal; and then the serum is obtained from the animal in the usual way. If desired, especially in using larger animals, there may be repeated withdrawals of blood for serum at suitable intervals; and these withdrawals may be interspersed with repeated injections of the modified antigen.

It is the serum thus obtained which contains the immunological anti-bodies for the production of passive immunity, and for combating the symptoms of the corresponding disease in patients suffering from such disease.

The injection of the serum is desirably intravenous, although it may be subcutaneous or intramuscular. Within a few hours after the injection, ordinarily, the syndrome of the disease for which the treatment is given begins to disappear. A single injection of the serum is often sufficient to produce permanent relief. In some cases, however, a single injection is not sufficient, as the symptoms of the disease, after disappearing for a few hours, sometimes recur later. When such symptoms do recur, whether once or more, another injection of the serum is indicated; and, if given, again produces relief. Rarely are more than two or three injections required.

This present application is directed to the generic phases of my invention, but also includes specific claims on the products used in producing diphtheria immunity. Specific claims to products used in producing immunity from other diseases are presented in separate applications; my copending application Serial No. 84,168, filed January 27, 1926, containing claims directed specifically to the modified scarlet fever antigen, and my copending application Serial No. 52,964, also filed August 27, 1925, containing claims directed specifically to the modified pneumococcic antigen and to the anti-pneumococcic serum and process of producing it.

In the following claims, in defining the material which is treated, and in defining one of the components of the mixture, I use the expression "bacteria, and/or their products or toxins," to denote either the bacteria alone, whether living or dead, or the products or toxins alone of said bacteria, or a mixture of such bacteria (living or dead) and the products or toxins produced thereby.

I claim as my invention:

1. The process of treating bacteria, and/or their products and toxins, to render them non-disease-producing and non-poisonous, which consists in applying thereto surface tension depressants consisting of soluble salts of the higher fatty acids which are adsorbed on the surfaces of the bacteria and the toxin molecules, substantially as herein described.

2. The process of treating bacteria, and/or their products and toxins, to render them non-disease-producing and non-poisonous, which consists in applying thereto surface tension depressants consisting of salts of the higher unsaturated fatty acids, which are adsorbed on the surfaces of the bacteria and the toxin molecules, substantially as herein described.

3. The process of treating bacteria, and/or their products and toxins, to render them non-disease-producing and non-poisonous, which consists in applying thereto surface tension depressants consisting of the salts of the higher unsaturated fatty acids containing one or more hydroxyl groups which are adsorbed on the surfaces of the bacteria and the toxin molecules, substantially as herein described.

4. The process of treating bacteria, and/or their products and toxins, to render them non-disease-producing and non-poisonous, which consists in applying thereto castor oil soap.

5. The process of treating bacteria, and/or their products or toxins, to increase the amount thereof which may be injected on a first immunizing dose, comprising treating said bacteria, and/or their products or toxins, with a soluble salt of an organic acid which is a surface-tension depressant.

6. The process of treating bacteria, and/or their products or toxins, to increase the amount thereof which may be injected on a first immunizing dose, comprising treating said bacteria, and/or their products or toxins, with a surface-tension depressant comprising a soluble salt of a higher fatty acid.

7. The process of treating bacteria, and/or their products or toxins, to increase the amount thereof which may be injected on a first immunizing dose, comprising treating said bacteria, and/or their products or toxins, with a surface-tension depressant comprising a soluble salt of a higher unsaturated fatty acid.

8. The process of treating bacteria, and/or their products or toxins, to increase the amount thereof which may be injected on a first immunizing dose, comprising treating said bacteria, and/or their products or toxins, with a surface-tension depressant comprising a soluble salt of a higher fatty acid containing one or more hydroxyl groups.

9. The process of treating bacteria, and/or their products or toxins, to increase the amount thereof which may be injected on a first immunizing dose, comprising treating said bacteria, and/or their products or toxins, with a surface-tension depressant comprising a soluble salt of a higher unsaturated fatty acid containing one or more hydroxyl groups.

10. The process of treating bacteria, and/or their products or toxins, to increase the amount thereof which may be injected on a first immunizing dose, comprising treating said bacteria, and/or their products or toxins, with a soluble salt of ricinoleic acid.

11. The process of treating a bacterial toxin to increase the amount thereof which may be injected on a first immunizing dose, comprising treating said toxin with castor oil soap.

12. The process of producing an immunizing anti-body serum, comprising treating bacteria, and/or their products or toxins, as set forth in claim 1, injecting said treated material into an animal, and obtaining blood serum from said animal.

13. The process of producing an immunizing anti-body serum, comprising treating bacteria, and/or their products or toxins, as set forth in claim 2, injecting said treated material into an animal, and obtaining blood serum from said animal.

14. The process of producing an immunizing anti-body serum, comprising treating bacteria, and/or their products or toxins, as set forth in claim 3, injecting said treated material into an animal, and obtaining blood serum from said animal.

15. The process of producing an immunizing anti-body serum, comprising treating bacteria, and/or their products or toxins, as set forth in claim 4, injecting said treated material into an animal, and obtaining blood serum from said animal.

16. The process of producing an immunizing anti-body serum, comprising treating bacteria, and/or their products or toxins, with a soluble salt of an organic acid which is a surface-tension depressant; injecting such treated material into an animal; and obtaining blood serum from said animal.

17. The process of producing an immunizing anti-body serum, comprising treating bacteria, and/or their products or toxins, with a surface-tension depressant comprising a soluble salt of a higher fatty acid; injecting such treated material into an animal; and obtaining blood serum from said animal.

18. The process of producing an immunizing anti-body serum, comprising treating bacteria, and/or their products or toxins, with a surface-tension depressant comprising a soluble salt of a higher unsaturated fatty acid; injecting such treated material into an animal; and obtaining blood serum from said animal.

19. The process of producing an immunizing anti-body serum, comprising treating bacteria, and/or their products or toxins, with a surface-tension depressant comprising a soluble salt of a higher fatty acid containing one or more hydroxyl groups; injecting such treated material into an animal; and obtaining blood serum from said animal.

20. The process of producing an immunizing anti-body serum, comprising treating bacteria, and/or their products or toxins, with a surface-tension depressant comprising a soluble salt of a higher unsaturated fatty acid containing one or more hydroxyl groups; injecting such treated material into an animal; and obtaining blood serum from said animal.

21. The process of producing an immunizing anti-body serum, comprising treating bacteria, and/or their products or toxins, with a soluble salt of ricinoleic acid; injecting such treated material into an animal; and obtaining blood serum from said animal.

22. The process of producing an immunizing anti-body serum, comprising treating bacteria, and/or their products or toxins, with castor oil soap; injecting such treated material into an animal; and obtaining blood serum from said animal.

23. The process of treating diphtheria toxin to increase the amount thereof which may be injected on a first immunizing dose, comprising treating said toxin with a soluble salt of an organic acid which is a surface-tension depressant.

24. The process of treating diphtheria toxin to increase the amount thereof which may be injected on a first immunizing dose, comprising treating said toxin with castor oil soap.

25. The process of producing anti-diphtheria serum, comprising treating diphtheria toxin with a soluble salt of an organic acid which is a surface-tension depressant; injecting such treated toxin into an animal; and obtaining blood serum from said animal.

26. The process of producing anti-diphtheria serum, comprising treating diphtheria toxin with castor oil soap; injecting such treated toxin into an animal; and obtaining blood serum from said animal.

27. Immunizing material consisting of bacteria, and/or their products or toxins, rendered non-disease-producing and non-poisonous by having applied thereto salts of organic acids which are surface-tension depressants and which are adsorbed on to the surface of the bacteria and/or toxin molecules.

28. Immunizing material consisting of bacteria, and/or their products or toxins, rendered non-disease-producing and non-poisonous by having applied thereto castor oil soap.

29. Immunizing material consisting of bacteria, and/or their products or toxins, rendered non-disease-producing and non-poisonous by having applied thereto surface-tension depressants consisting of salts of the higher unsaturated fatty acids, which are adsorbed on the surfaces of the bacteria and/or the toxin molecules, substantially as herein described.

30. Immunizing material consisting of bacteria, and/or their products or toxins, rendered non-disease producing and non-poisonous by having applied thereto surface-tension depressants consisting of salts of the higher unsaturated fatty acids containing one or more hydroxyl groups, which are adsorbed on the surfaces of the bacteria and/or the toxin molecules, substantially as herein described.

31. A composition of matter, comprising a mixture of bacteria, and/or their products or toxins and a soluble salt of an organic acid which is a surface-tension depressant.

32. A composition of matter, comprising a mixture of bacteria, and/or their products or toxins and a surface-tension depressant comprising a soluble salt of a higher fatty acid.

33. A composition of matter, comprising a mixture of bacteria, and/or their products or toxins and a surface-tension depressant comprising a soluble salt of a higher unsaturated fatty acid.

34. A composition of matter, comprising a mixture of bacteria, and/or their products or toxins and a surface-tension depressant comprising a soluble salt of a higher fatty acid containing one or more hydroxyl groups.

35. A composition of matter, comprising a mixture of bacterial, and/or their products or toxins and a surface-tension depressant comprising a soluble salt of a higher unsaturated fatty acid containing one or more hydroxyl groups.

36. A composition of matter, comprising a mixture of bacteria, and/or their products or toxins and a soluble salt of ricinoleic acid.

37. A composition of matter, comprising a mixture of bacteria, and/or their products or toxins and castor oil soap.

38. A composition of matter, comprising a mixture of diphtheria toxin and a soluble salt of an organic acid which is a surface-tension depressant.

39. A composition of matter, comprising a mixture of diphtheria toxin and a surface-tension depressant comprising a soluble salt of a higher fatty acid.

40. A composition of matter, comprising a mixture of diphtheria toxin and a surface-tension depressant comprising a soluble salt of a higher unsaturated fatty acid.

41. A composition of matter, comprising a mixture of diphtheria toxin and a surface-tension depressant comprising a soluble salt of a higher fatty acid containing one or more hydroxyl groups.

42. A composition of matter, comprising a mixture of diphtheria toxin and a surface-tension depressant comprising a soluble salt of a higher unsaturated fatty acid containing one or more hydroxyl groups.

43. A composition of matter, comprising a mixture of diphtheria toxin and a soluble salt of ricinoleic acid.

44. A composition of matter, comprising a mixture of diphtheria toxin and castor oil soap.

45. Serums for therapeutic use obtained from animals which have received injections of bacteria, and/or their products and toxins, previously treated with salts of the higher fatty acids, substantially as herein described.

46. Serums for therapeutic use obtained from animals which have received injections of bacteria, and/or their products and toxins, previously treated with castor oil soap, substantially as herein described.

47. Serums for therapeutic use obtained from animals which have received injections of bacteria, and/or their products and toxins, previously treated with salts of the higher unsaturated fatty acids, substantially as herein described.

48. Serums for therapeutic use obtained from animals which have received injections of bacteria, and/or their products and toxins, previously treated with salts of the higher unsaturated fatty acids containing one or more hydroxyl groups, substantially as described.

49. An anti-diphtheria serum obtained from an animal which has received one or more injections of diphtheria toxin previously treated with a soluble salt of an organic acid which is a surface-tension depressant.

50. An anti-diphtheria serum obtained from an animal which has received one or more injections of diphtheria toxin previously treated with a surface-tension depressant comprising a soluble salt of a higher fatty acid.

51. An anti-diphtheria serum obtained from an animal which has received one or more injections of diphtheria toxin previously treated with a surface-tension depressant comprising a soluble salt of a higher unsaturated fatty acid.

52. An anti-diphtheria serum obtained from an animal which has received one or more injections of diphtheria toxin previously treated with a surface-tension depressant comprising a soluble salt of a higher fatty acid containing one or more hydroxyl groups.

53. An anti-diphtheria serum obtained from an animal which has received one or more injections of diphtheria toxin previously treated with a surface-tension depressant comprising a soluble salt of a higher unsaturated fatty acid containing one or more hydroxyl groups.

54. An anti-diphtheria serum obtained from an animal which has received one or more injections of diphtheria toxin previously treated with a soluble salt of ricinoleic acid.

55. An anti-diphtheria serum obtained from an animal which has received one or more injections of diphtheria toxin previously treated with castor oil soap.

In witness whereof, I have hereunto set my hand this 31st day of October, 1925.

WINFORD P. LARSON.